DE WITT C. THOMPSON, OF ISCHUA, NEW YORK.

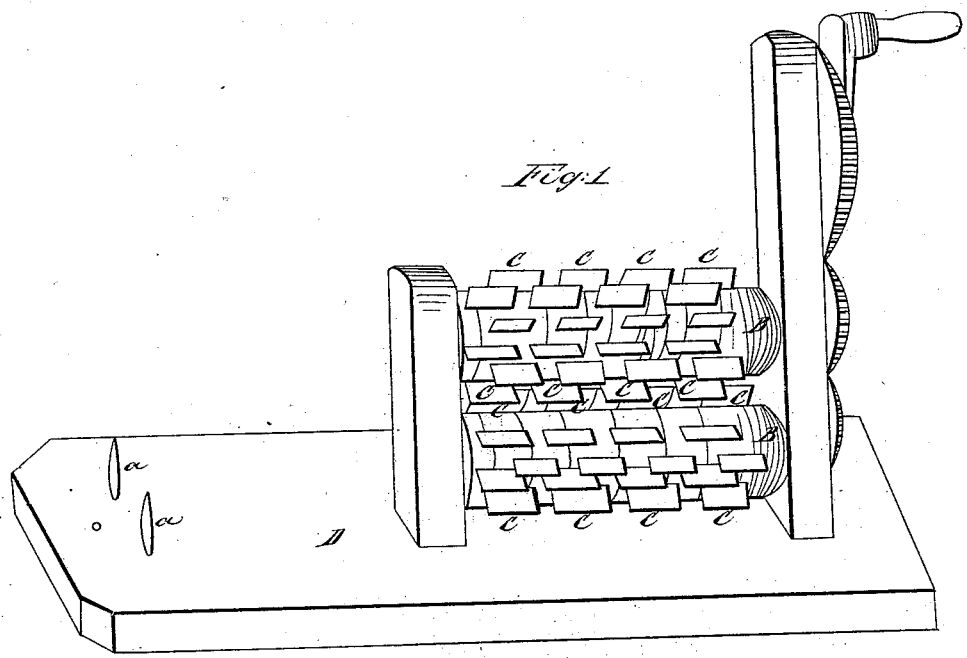

*Letters Patent No. 84,718, dated December 8, 1868.*

IMPROVED BEEF-STEAK CUTTER AND MANGLER.

The Schedule referred to in these Letters Patent and making part of the same.

*To all whom it may concern:*

Be it known that I, DE WITT C. THOMPSON, of the town of Ischua, county of Cattaraugus, and State of New York, have invented a new and useful Machine for Cutting and Preparing Beef and other Steak for cooking; and I do hereby declare that the following is a full and exact description thereof, reference being had to the accompanying drawings, and to the letters of reference marked thereon, making a part of this specification.

The nature of my invention consists in providing two upright prongs or forks, (marked A in said drawings,) firmly fastened in a platform, (marked D in said drawings,) upon which is to be placed the steak, for the purpose of cutting the same, after which the pieces so cut are to be run between two wooden, iron, or other rollers, (marked B in said drawings,) from two to four inches in diameter, and from eight to twelve or more inches long, as the nature of the machine may require, fastened, by means of upright posts, to the same platform upon which the forks are placed, in which rollers knives, (marked C in said drawings,) about one inch long and three-fourths of an inch wide, are to be placed, and firmly fastened by grooving, or any other means that will accomplish that end, in rows, about one-half an inch apart; the knives in each row to be so placed that the interval between the knives in the row next preceding will be covered, such interval to be about one-fourth of an inch; said rows to be so placed upon said rollers that each row of knives in each roller will strike the opposite roller in the opposite space between its row of knives; which said rollers are to be far enough apart to admit the width of the knives to pass between, and are to be run in opposite directions by means of cog-wheels, or any other combination of machinery that will effect that object.

What I claim as my invention, and desire to secure by Letters Patent, is—

The combination of the forks A with the platform D, and rollers B, and sharp knives C, as above described, for the purpose specified.

D. C. THOMPSON.

Witnesses:
O. YATES,
H. F. HATCH.